A. MEINERT.
AUTOMATIC MACHINE FOR SELLING LIQUIDS.
APPLICATION FILED MAR. 16, 1909.
938,326.
Patented Oct. 26, 1909.
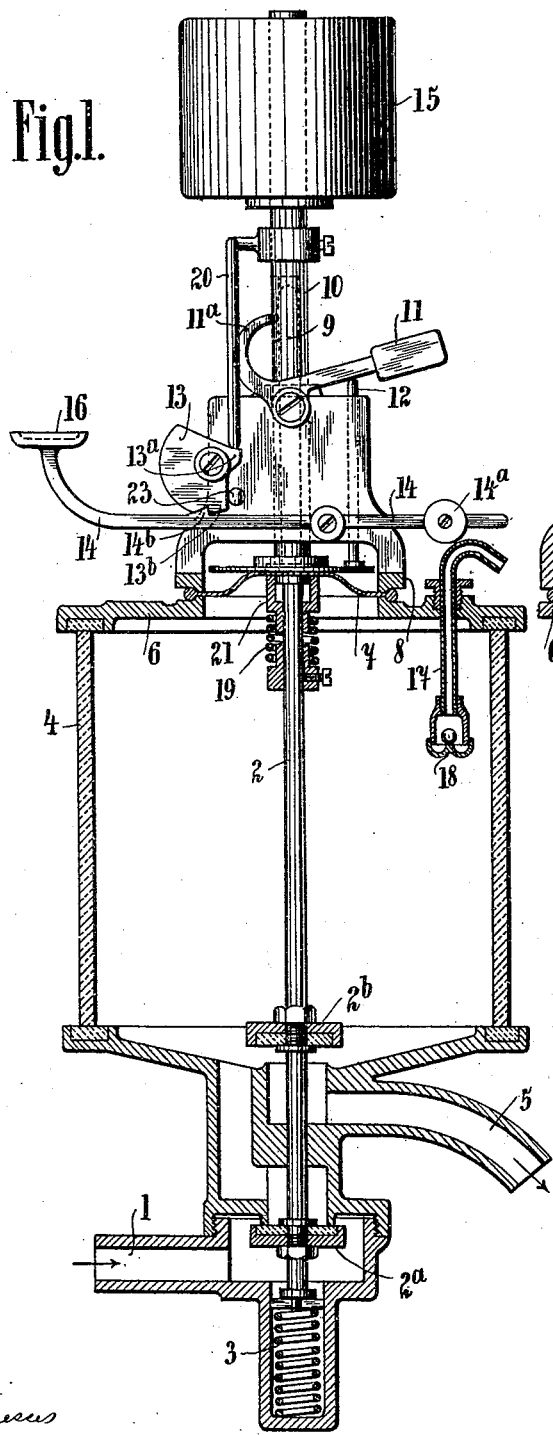

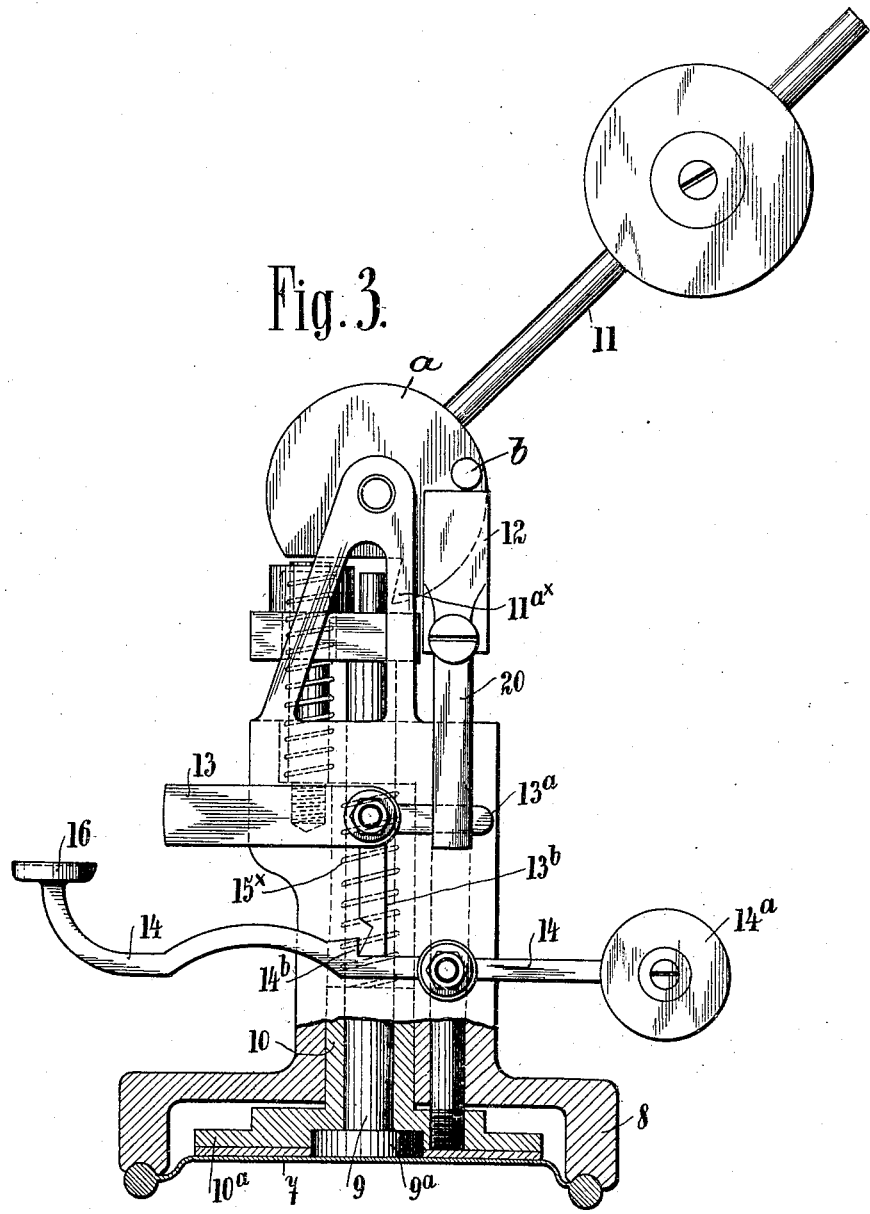

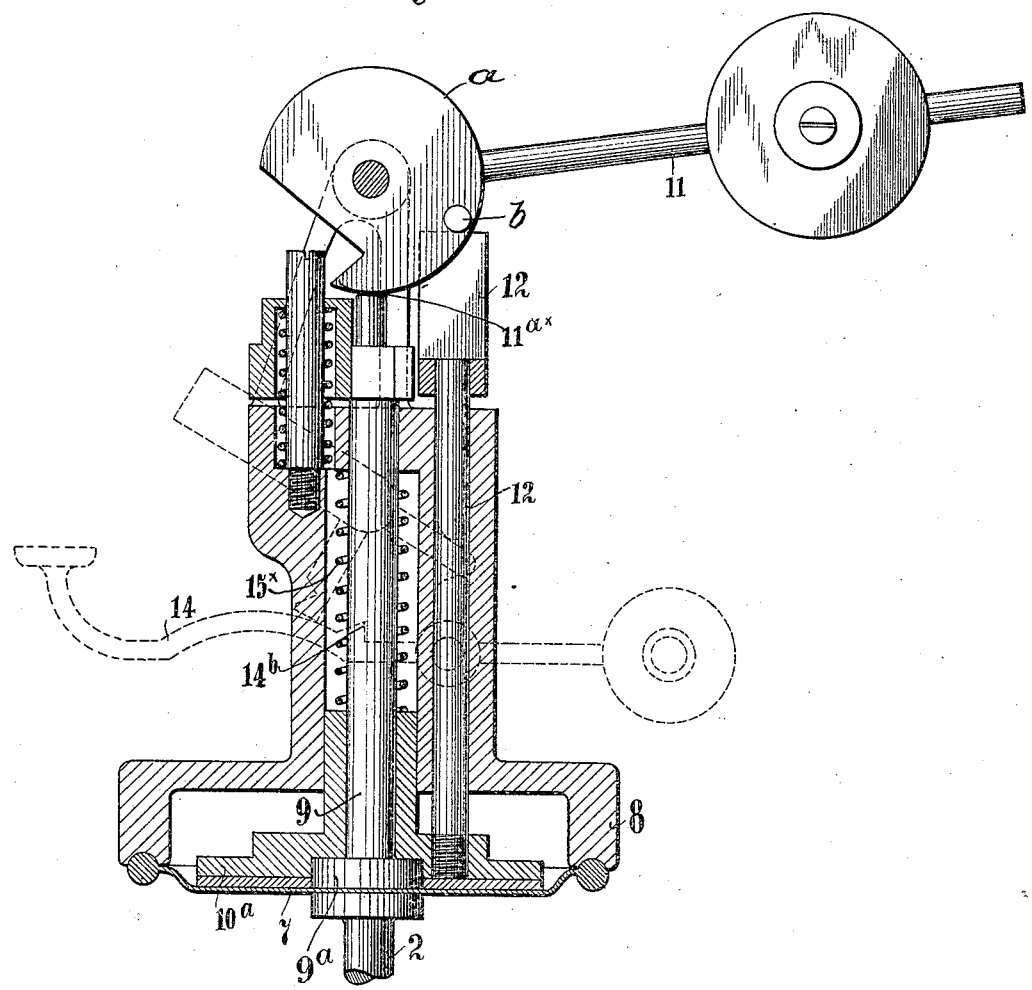

UNITED STATES PATENT OFFICE.

ANTON MEINERT, OF NECKARAU, NEAR MANNHEIM, GERMANY.

AUTOMATIC MACHINE FOR SELLING LIQUIDS.

938,326.   Specification of Letters Patent.   Patented Oct. 26, 1909.

Application filed March 16, 1909. Serial No. 483,852.

*To all whom it may concern:*

Be it known that I, ANTON MEINERT, a subject of the Grand Duke of Hesse, residing at 46 Schulstrasse, Neckarau, near Mannheim, Germany, have invented certain new and useful Improvements in Automatic Machines for Selling Liquids; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to an automatic machine for selling liquids in which the inlet and outlet valves in the measuring receptacle are controlled by the coöperation of an air-outlet valve, which closes at a certain level of the liquid, and a diaphragm stretched by the pressure of the entering liquid. In accordance with the invention a driving member is arranged on which work is to be done by the diaphragm and which is to close the outlet and open the inlet for the liquid.

In order that the invention may be clearly understood reference is made to the accompanying drawings in which one embodiment is represented by way of example and in which—

Figure 1 is an elevation partly in section of a machine in its normal position corresponding to that when liquid flows out, and Fig. 2 is a vertical section through a detail in another position. Figs. 3 and 4 show a somewhat modified form in vertical section, the driving member being strained, and in the position after its release.

The measuring vessel 4 (Fig. 1) has an inlet 1 and an outlet 5 which are controlled by valves $2^a$ and $2^b$. The valves $2^a$ and $2^b$ are mounted in such a manner on a common spindle 2 that the one must be open when the other is closed. The valve-spindle 2 is under the action of a spring 3 which tends to close the valve $2^a$. In addition, the pressure of the liquid existing in the supply pipe 1 also acts on the valve $2^a$ in the closed position, tending to keep it closed.

The cover 6 of the vessel 4 has in its center a hole closed by a diaphragm 7. The latter is clamped air-tight between the rim around the hole in the cover, and the annular base of a pedestal 8. The diaphragm rests in the center on a socket 21, which is supported by a spring 19 carried by a shoulder on the sleeve $19^b$ surrounding the valve-spindle 2 and secured thereto by a set-screw $19^a$. On the socket 21 and, when spring 19 is compressed, also on the upper end of the spindle 2 itself there is supported a pin 9 by means of its base-plate $9^a$ and by means of the diaphragm 7 situated between this base-plate and spindle. The pin 9 is surrounded by a hollow rod 10 guided in the pedestal 8; this rod is loaded by a driving member or weight 15 and runs out below into a broad plate $10^a$ resting on the diaphragm 7. With the plate $10^a$ there is connected a pin 12 extending upward and guided through a hole in the pedestal 8. On the upper end of this pin 12 there rests the weighted arm 11 of a two-armed lever which engages with its hook-shaped curved other arm $11^a$ in a slot 22 of the hollow rod 10 and according to the position of the pin 9 lies with its end against or engages over it.

On the pedestal 8 there is journaled a lever $13^a$, $13^b$ which under the action of a disk-shaped counterweight 13 tends to lie against a stop 23 limiting its movement. In the position shown in Fig. 1 the rod 10 with weight 15 is resting on the lever-arm $13^a$ by means of its support 20, so that the lever $13^a$, $13^b$ takes up the entire pressure of the weight, and the diaphragm and valve-spindle are unloaded. The lever $13^a$, $13^b$ is prevented from rotating by its arm $13^b$ lying against a nose $14^b$ of a locking lever 14. This engagement is assured by loading the lever 14 by means of a weight $14^a$. The locking-lever is provided on its free end with a key 16 by which it may be actuated.

Through the cover 6 of the measuring vessel there passes a pipe 17 which carries at its interior end a floating ball-valve 18 and serves for conducting away the air expelled by the entering liquid and for the admission of air when liquid is run off.

The described device operates as follows: By putting down the key 16 the locking-lever 14 is depressed and releases the lever $13^a$, $13^b$. Consequently the driving member or weight 15 with the rod 10 sinks, the lever 13ª, 13ᵇ rotating. The valve-spindle 2 is driven and the valve 2ᵇ pressed on its seat, whereas the valve 2ª opens. Liquid now enters through the inlet 1 into the vessel 4, air escaping through pipe 17. With the weight 15 and the rod 10, the pin 9 has also fallen so far that the lever 11, 11ª, under the action of its load, will engage the same with the end of its hook-shaped curved arm 11ª over it (Fig. 2). In this manner the closure of the valve 2ᵇ is assured independently of the further pressure of the weight 15.

When the level of the liquid in the vessel 4 has reached the floating valve 18, the ball of the latter is raised and closes the outlet. In this manner a pressure above that of the atmosphere arises in the vessel, under which the diaphragm 7 rises. As the pin 9 is held by the lever arm 11ª, only the rod 10 with the weight 15 at first participates in the rising movement of the diaphragm 7 (Fig. 2), so that the valve 2ᵇ still remains closed. The support 20 also descends with the rod 10, so that the lever 13ª, 13ᵇ can rotate counter-clockwise in the direction to the stop 23. Its arm 13ᵇ slides, pressing the lever 14 backward, over the nose 14ᵇ of the latter, which nose thereupon rises with the lever 14 and lies behind the arm 13ᵇ, so that it prevents the lever 13ª, 13ᵇ returning. At this moment the lever-arm 11 is also already raised by the pin 12 rising with the rod 10 so far that at the next moment the hook-shaped arm 11ª releases the pin 9. The valve-spindle 2 now also moves with the pin 9, the diaphragm 7 following under the action of the spring 3 and the pressure of the liquid acting on the valve 2ª. The latter is closed, the valve 2ᵇ opened and the liquid flows out of the vessel through the outlet 5, whereas air flows in through pipe 17. As soon as valve 2ᵇ is opened the pressure in the vessel 4 disappears. The diaphragm 7 remains however in the raised position under the pressure of the liquids and spring acting from below on the spindle 2, since the weight 15 exceeding this pressure is taken up by the lever 13ª, 13ᵇ. All the parts are now again in the commencing position (Fig. 1).

By reference to Figs. 3 and 4 wherein is shown a modification of that form of my invention illustrated in Figs. 1 and 2, it will be apparent that the structure of the modified form of apparatus varies from the preferred form only in details of construction. For instance in the modifications shown in Figs. 3 and 4, the weight 15 as shown in Figs. 1 and 2, has been replaced by a spring 15ˣ which is placed and caused to operate in a bore provided for this purpose in the frame of the apparatus. In this instance also the pin 9 is supported by the base plate 9ª which in turn bears against the diaphragm 7 and is carried by the upper end of the valve-rod 2. The cylindrical sleeve 10 also surrounds a portion of the pin 9 and at its lower extremity is provided with a disk head 10ª which also bears upon the diaphragm 7. In this disk-head 10ª there is connected a pin 12 which extends upwardly parallel with the pin 9 and the pin 12 and preferably extends through a bore provided therefor in the frame of the apparatus.

In an upward extension of the frame of the apparatus and above the pin 9 there is pivotally mounted a cam disk $a$ to which is suitably connected a gravity lever 11 and in a suitable position in its face the cam disk $a$ is provided with a nose 11ᵃˣ; the cam disk $a$ being so mounted as to come directly above the upper end of the pin 9 which latter is adapted to engage the face of the cam. On the frame 8 of the apparatus there is also pivotally mounted a lever whose arms are indicated at 13ª 13ᵇ; these arms being preferably formed at a right angle to one another, and extending in line with the arm 13ª is a member 13 which acts as a counter-weight. The lever arm 13ª adjacent to its outer end engages a support arm 20 which latter extends upwardly and in any desired manner is connected to the pin 12 above the frame 8; the upper end of the pin 12 being adapted to come directly beneath and contact with a lug $b$ on the cam disk $a$.

14 designates an actuating lever which is also pivotally connected to a frame 8. One end of this actuating lever is provided with a key 16 by which the same is depressed, and between the key 16 and its pivotal point the lever 14 is provided with a nose 14ᵇ adapted to engage the end of the lever arm 13ᵇ, and at its opposite end the actuating lever 14 is provided with a counter-weight 14ª.

In this structure, manifestly, the support arm 20 is maintained in position by means of the lever arms 13ª 13ᵇ, the position of which lever arms is normally maintained as shown in Fig. 3, by the end of the lever-arm 13ᵇ engaging the nose 14ᵇ of the actuating lever 14, and the support 20 in turn carries the pin 12 which not only maintains the cam disk $a$ and the gravity lever 11 in the position shown in Fig. 3, but also maintains the cylindrical sleeve 10 in position against the action of the spring 15ˣ, whereby the action of the spring 3 is permitted to maintain the valve rod 2 and the valve 2ª in a normally closed position as shown in Fig. 1.

The operation of the modified form of vending apparatus as shown in Figs. 3 and 4 is as follows:—By depressing the key 16 the right hand end of the actuating lever 14 is lowered against the action of the counter-weight 14ª whereby the lever-arm 13ᵇ is released, whereupon the action of the spring 15ˣ is brought into play causing the cylindrical sleeve 10 and the pins 9 and 12 to descend, depressing the diaphragm 7 from the position shown in Fig. 3 to approximately that shown in Fig. 4, and in so doing the head $9^a$ of the pin 9 causes the valve-rod 2 to also descend against the action of the spring 3, thereby opening the valve $2^a$ and closing the valve $2^b$, permitting the receptacle 4 to be filled with the liquid to be vended from the supply pipe 1. As the pins 9 and 12 descend they will also permit the descent of the gravity-lever 11 whereby a partial rotation is given to the cam disk $a$ causing the nose $11^{ax}$ thereof to pass over the upper extremity of the pin 9.

Now as hereinbefore described in connection with Figs. 1 and 2, when the tank or receptacle 4 is filled to a predetermined point, the valve 18 is closed and thereupon a pressure is created which increases as the liquid continues to flow into the tank until the said pressure is sufficient to raise the diaphragm 7 which as will be understood, carries with it the cylindrical sleeve 10 and the pin 12; the pin 9 being held in position by means of the cam disk $a$ until the same shall have been turned sufficiently by means of the pin 12 to cause the nose $11^{ax}$ of the cam disk to be turned free of the end of the pin 9, whereupon the spring 3 is liberated and causes the valve-rod 2 to rise, carrying with it the pin 9 and closing the valve $2^a$ and opening the valve $2^b$, thereby permitting the liquid to flow from the tank 4 by way of the outlet 5. The pin 12 in returning to the position shown in Fig. 3 permits the counter-weight 13 to descend to move the lever-arms $13^a$ and $13^b$ in order to re-set the latter in position with its lower extremity engaging the ends $14^b$ of the actuating lever 14, and in these positions as will be understood the parts are again normally placed and the apparatus is ready to be re-operated.

What I claim as my invention and desire to secure by Letters Patent is:—

1. In an automatic machine of the type described, a vessel having an inlet and an outlet, a diaphragm mounted in one side of the vessel, and a valve-spindle continuously contacting said diaphragm, said spindle carrying valves adapted to open and close said inlet and outlet, in combination with a movable driving member, means operatively connecting said driving member through said diaphragm with said spindle, a locking device, and means operatively connecting the latter through said diaphragm with said spindle, the arrangement being such that when said diaphragm is moved in the direction of said driving means and locking device, work is first done on said driving member and the same is raised, the locking device is then released, whereupon the valve-spindle is moved into the discharge position.

2. In an automatic machine of the type described, a vessel having an inlet and an outlet, a diaphragm mounted in one side of the vessel, and a valve-spindle continuously contacting said diaphragm, said spindle carrying valves adapted to open and close said inlet and outlet, in combination with a movable driving member, means operatively connecting said driving member through said diaphragm with said spindle, a locking device, means operatively connecting the latter through said diaphragm with said spindle, a weighted lever having a detent, revoluble on said vessel and adapted to be actuated by hand, and a supporting lever adapted to engage said detent and support said driving member in its raised position, the arrangement being such that when said detent is released from said supporting lever, the driving member is released and reverses the valve-spindle into the admission position.

3. In an automatic machine of the type described, a vessel having an inlet and an outlet, a diaphragm mounted in one side of the vessel, and a valve-spindle continuously contacting said diaphragm, said spindle carrying valves adapted to open and close said inlet and outlet, in combination with a weight, a hollow rod movably supported on said diaphragm and said spindle and carrying said weight, a pin in said rod and movably supported on said diaphragm and said spindle, a two-armed lever adapted to engage and hold said pin in its lowest position, and means actuated by said diaphragm for disengaging said two-armed lever from said pin.

4. In an automatic machine of the type described, a vessel having an inlet and an outlet, a diaphragm mounted in one side of the vessel, and a valve-spindle continuously contacting said diaphragm, said spindle carrying valves adapted to open and close said inlet and outlet in combination with a weight, a hollow rod carrying said weight and having a base-plate movably supported on said diaphragm and said spindle, a pin in said rod and movably supported on said diaphragm and said spindle, a two-armed lever adapted to engage and hold said pin in its lowest position, and another pin on said base-plate adapted to disengage said two-armed lever from said former pin.

5. In an automatic machine of the type described, a vessel having an inlet and an outlet, a diaphragm mounted in one side of the vessel, and a valve-spindle continuously contacting said diaphragm, said spindle carrying valves adapted to open and close said inlet and outlet, in combination with a weight, a hollow rod carrying said weight and having a base-plate movably supported on said diaphragm and said spindle, a pin in said rod and movably supported on said diaphragm and said spindle, a two-armed lever adapted to hold said pin in its lowest position, another pin on said base-plate adapted to release said two-armed lever from said former pin, a weighted lever having a detent and adapted to be actuated by hand, another supporting rod attached to said weight and a supporting lever adapted to be held by said detent and support said supporting rod and said weight, as set forth.

In testimony that I claim the foregoing as my invention, I have signed my name in presence of two subscribing witnesses.

ANTON MEINERT.

Witnesses:
OTTO NARTINIL,
JOS. H. LEUTE.